United States Patent [19]
Coltrain

[11] Patent Number: 5,161,258
[45] Date of Patent: Nov. 10, 1992

[54] GARMENT FOR RESTRAINING A CHILD IN A VEHICLE

[76] Inventor: Lori A. Coltrain, 419 N. Mulford Rd. #3, Rockford, Ill. 61107

[21] Appl. No.: 623,779

[22] Filed: Dec. 6, 1990

[51] Int. Cl.⁵ .......................... A41D 1/02; B60R 21/10
[52] U.S. Cl. .......................................... 2/102; 2/108; 297/465
[58] Field of Search ............... 2/2, 44, 45, 69, 92, 2/94, 95, 96, 102, 108, 85, 98, 100, 93, 80; 280/801, 803, 806, 808; 297/465, 464, 483, 484, 487, 485, 482

[56] References Cited

U.S. PATENT DOCUMENTS

| | | | |
|---|---|---|---|
| 1,616,349 | 2/1927 | Cagle | 297/465 |
| 1,927,179 | 9/1933 | Levinsohn | 2/96 |
| 2,375,655 | 5/1945 | Irvin | 2/94 |
| 2,833,344 | 5/1958 | Lucht | 297/465 |
| 2,908,324 | 10/1959 | Muller et al. | 297/465 |
| 3,321,247 | 5/1967 | Dillender | 297/484 |
| 3,524,679 | 8/1970 | Lavenne | 297/465 |
| 3,827,716 | 8/1974 | Vaughn et al. | 280/801 |
| 3,914,798 | 10/1975 | O'Keefe | 2/100 |
| 3,973,643 | 8/1976 | Hutchinson | 2/94 |
| 3,992,040 | 11/1976 | Gannac | 297/465 |
| 4,143,914 | 3/1979 | Klich | 297/465 |
| 4,437,628 | 3/1984 | Schwartz | 297/465 |
| 4,759,569 | 7/1988 | Potter | 297/465 |
| 4,768,233 | 9/1988 | Grilliot et al. | 2/96 |
| 4,848,793 | 7/1989 | Huspen et al. | 280/801 |
| 5,031,960 | 7/1991 | Day | 297/465 |

FOREIGN PATENT DOCUMENTS

| | | | |
|---|---|---|---|
| 0147815 | 4/1981 | Fed. Rep. of Germany | 297/465 |
| 1310485 | 10/1962 | France | 297/465 |
| 0166141 | 7/1987 | Japan | 297/465 |

OTHER PUBLICATIONS

Gershman, Maurice, "Self Adhering Nylon Tapes", *Journal of AMA*, vol. 168, No. 7, Oct. 18, 1958.

Primary Examiner—Werner H. Schroeder
Assistant Examiner—Amy Brooke Vanatta
Attorney, Agent, or Firm—Leydig, Voit & Mayer

[57] ABSTRACT

A child is adapted to be zipped into a sleeveless vest which coacts with the lap and shoulder belts of a vehicle safety harness to restrain the child in the vehicle. The back side of the vest includes a generally horizontal loop for receiving the lap belt and further includes a vertically inclined loop for receiving the shoulder belt. Both loops are adapted to be opened and closed by zippers in order to enable the belts to be easily placed into and removed from the loops.

13 Claims, 2 Drawing Sheets

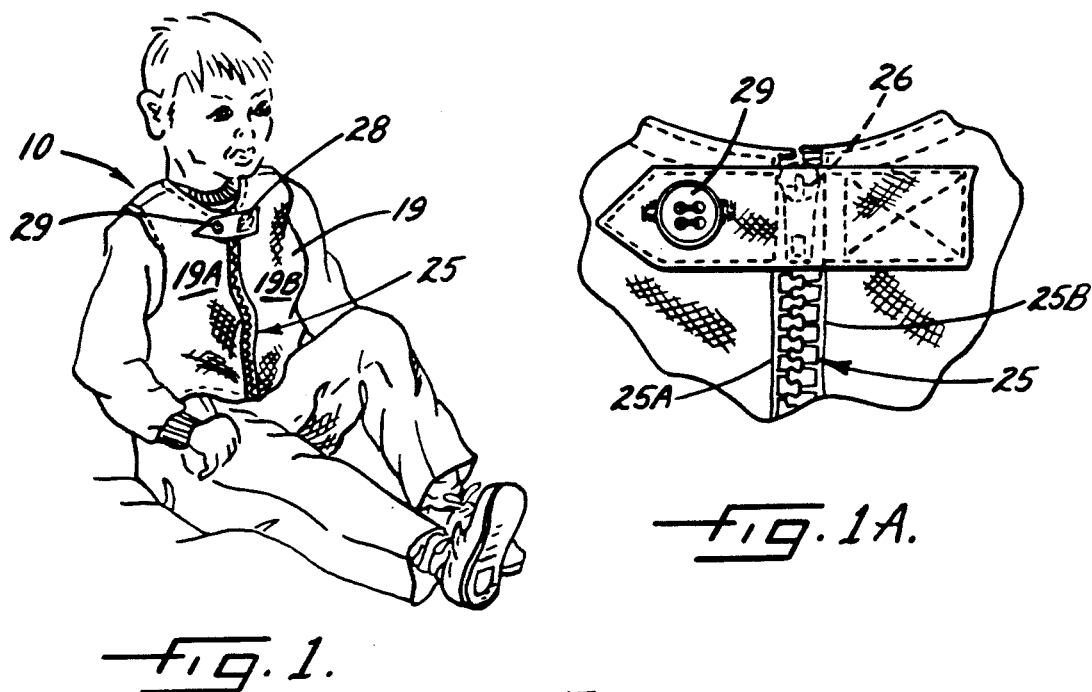
Fig. 1.
Fig. 1A.
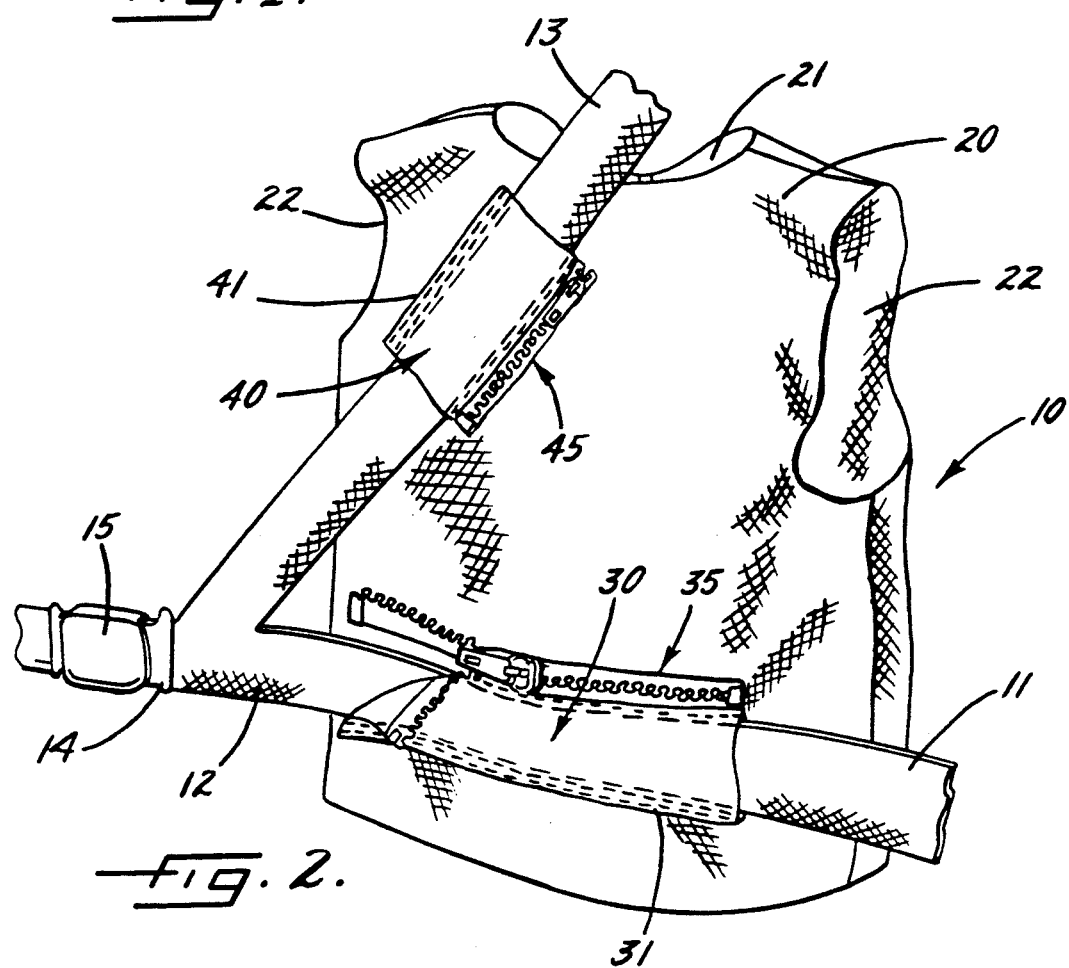
Fig. 2.

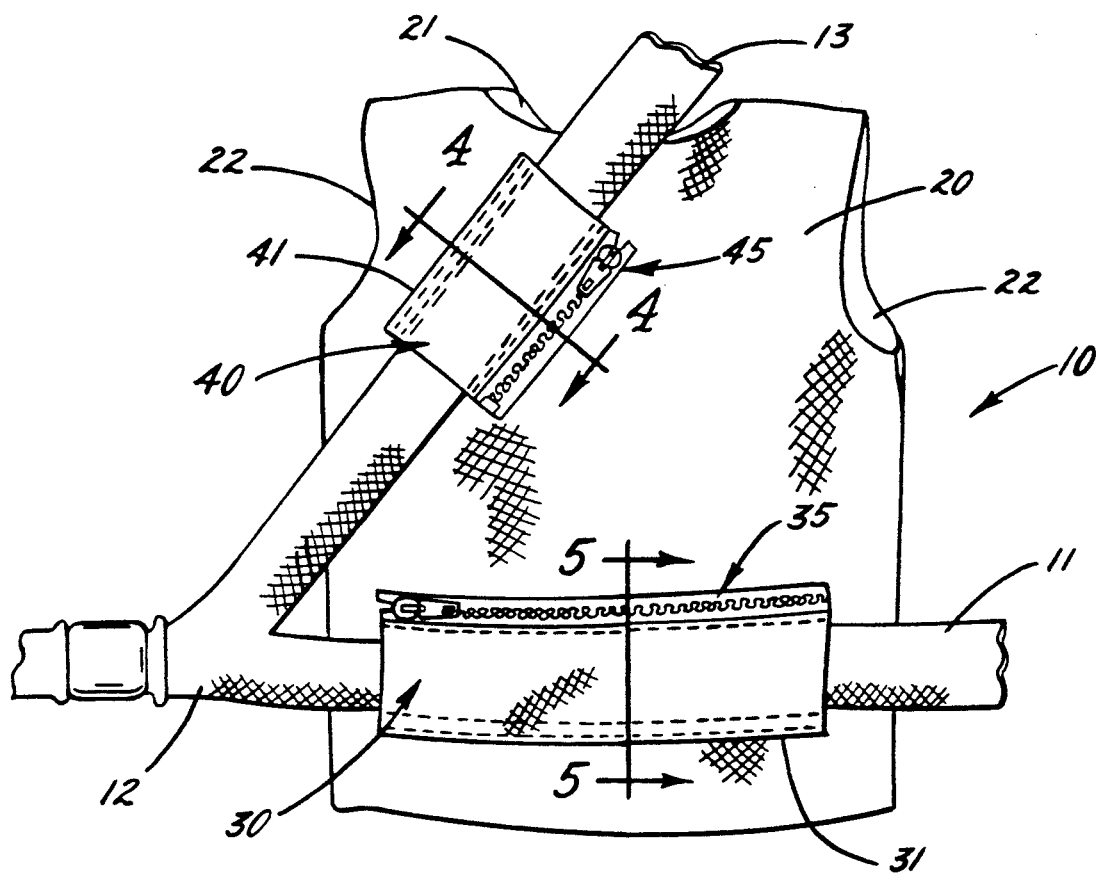
Fig. 3.
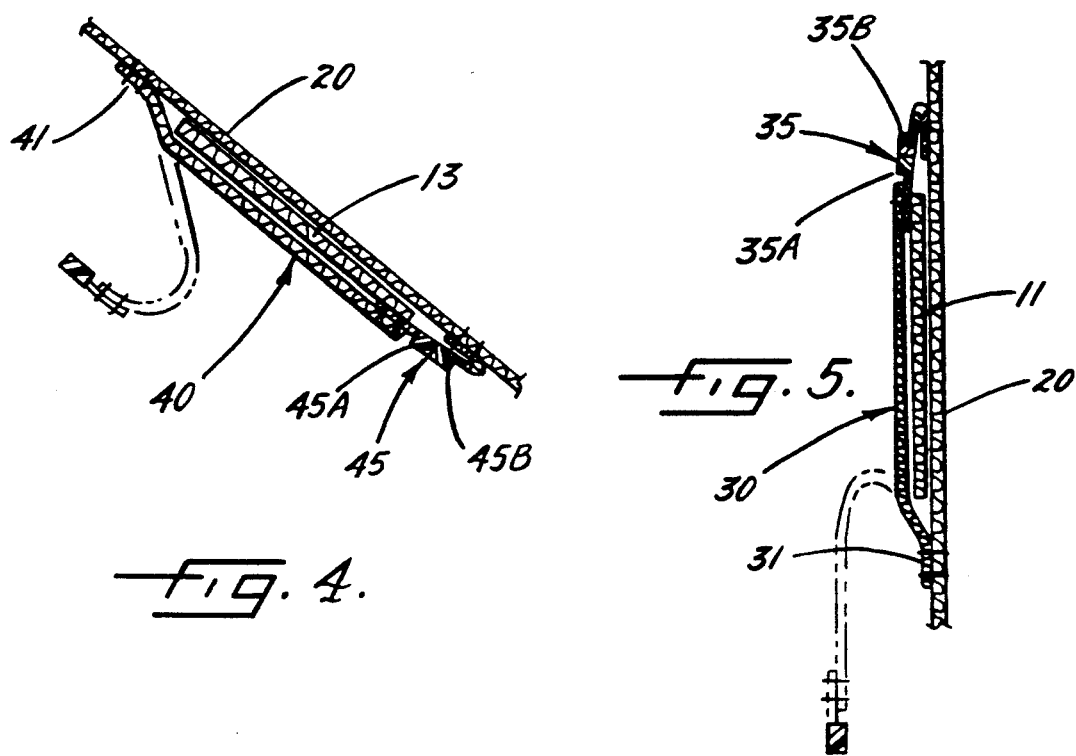
Fig. 4.
Fig. 5.

GARMENT FOR RESTRAINING A CHILD IN A VEHICLE

BACKGROUND OF THE INVENTION

Small children are usually restrained in vehicles such as a car by safety seats which are strapped to the car seat by the lap and shoulder belts of the safety harness of the car. Child safety seats are cumbersome to carry and, in addition, much time and effort is required in order to strap the safety seat in the car and to strap the child in the safety seat.

SUMMARY OF THE INVENTION

The general aim of the present invention is to provide a new and improved light weight and portable torso-type garment which may be worn by the child and which coacts with the lap and shoulder belts to restrain the child securely in the vehicle.

A more detailed object of the invention is to achieve the foregoing by providing a garment in the form of a vest which may be easily fitted onto the child and which includes releasable loops capable of being easily opened to receive the lap and shoulder belts and then closed around the belts to secure the vest to the belts.

A further object of the invention is to position the loops in accessible locations for ease of opening and closing the loops.

The invention also resides in the provision of a safety flap which helps guard against the child removing the vest.

These and other objects and advantages of the invention will become more apparent from the following detailed description when taken in conjunction with the accompanying drawings.

BRIEF DESCRIPTION OF THE DRAWINGS

FIG. 1 is a perspective view which shows a child wearing a new and improved restraint vest incorporating the unique features of the present invention.

FIG. 1a is an enlarged fragmentary view of the safety flap of the present invention.

FIG. 2 is a perspective view of the rear side of the vest and shows a portion of the vehicle safety harness.

FIG. 3 is an elevational view of the rear side of the vest and also shows, portions of the safety harness.

FIGS. 4 and 5 are enlarged fragmentary cross-sections taken substantially along the lines 4—4 and 5—5, respectively, of FIG. 3.

DETAILED DESCRIPTION OF THE PREFERRED EMBODIMENT

The present invention contemplates the provision of a new and improved torso-type garment, and particularly a sleeveless vest 10, adapted to be worn by a child and adapted to coact with the safety harness of a vehicle to restrain the child in the vehicle. The safety harness of the passenger side of the vehicle is shown most clearly in FIG. 2 and includes a generally horizontally extending lap belt 11 extending right-to-left from an anchor point and joined at 12 to a shoulder belt 13. The shoulder belt extends downwardly and to the left from an anchor point to the junction 12 with the lap belt. A tongue 14 located to the left of the junction 12 is adapted to plug releasably into a conventional female socket 15 which is anchored relative to the vehicle.

The vest 10 is made of washable fabric or other flexible material and includes front and back sides 19 and 20. Neck-receiving means in the form of a neck hole 21 is located between the front and back sides at the upper end of the vest. Arm-receiving means in the form of arm holes 22 also are located between the front and rear sides and are positioned near the upper end of the vest.

Preferably, the front side 19 of the vest 10 is defined by two identical halves 19A and 19B (FIG. 1) which may be opened to permit the vest to be fitted easily on the child. The two halves 19A and 19B are adapted to be releasably fastened together by a conventional zipper 25 having zipper strips 25A and 25B secured to the halves 19A and 19B, respectively, and having an actuating pull 26 which is located near the neck hole 21 when the zipper is fully closed. Thus, by opening the zipper 25, the vest 10 may be placed on the child and, when the zipper is closed, the vest is held securely in place.

Advantageously, means are provided for covering the zipper pull 26 when the zipper 25 is fully closed and for making it difficult for the child to open the zipper and slip out of the vest 10. Herein, these means comprise a fabric safety flap 28 (FIG. 1) having one end sewed to the vest half 19B adjacent the neck hole 21. The flap is adapted to be placed across the pull 26 and fastened releasably to the vest half 19A. In this instance, releasable fastening of the free end portion of the flap 28 is effected by means of a button 29 on the vest half 19A and adapted to fit through a button hole in the free end portion of the flap 28.

In carrying out the invention, a releasable belt loop 30 extends generally horizontally across the lower end portion of the back side 20 of the vest 10 and is adapted to receive the lap belt 11. Herein, the belt loop 30 is formed by a flap of fabric having one edge, preferably its lower edge 31, sewed to the back side 20 of the vest 10. The loop 30 thus may be folded downwardly and rearwardly to enable the lap belt 11 to be placed across the back side 20 of the vest in the vicinity of the loop. Thereafter, the loop is folded upwardly and forwardly and its upper edge is secured releasably to the back side 20 of the vest in order to captivate the belt 11 in the loop. Preferably, the upper edge of the loop 30 is secured releasably to the back side 20 by a zipper 35 having one zipper strip 35A secured to the upper edge of the loop and a second strip 35B secured to the back side of the vest above the first strip. By completely opening the zipper 35, the upper edge of the loop 30 may be completely released from the back side of the vest to permit the belt 11 to be placed between the loop and the back side. When the loop 30 is folded upwardly and zipped, the belt 11 is captivated in the loop and acts against the loop to restrain forward movement of the lower end portion of the vest.

Further in accordance with the invention, a second releasable loop 40 on the back side 20 of the vest 10 receives the shoulder belt 13 to restrain forward movement of the upper end portion of the vest. The second loop 40 also is formed by a flap of fabric and extends generally vertically along the left upper end portion of the back side 20 of the vest. To accommodate the angle of the shoulder belt 13, however, the loop 40 preferably is inclined so as to progress to the left upon proceeding downwardly.

One edge, preferably the left edge 41, of the loop 40 is sewed or otherwise fixed to the back side 20 of the vest 10 while the right edge of the loop is releasably attached to the back side by a zipper 45, the latter having one zipper strip 45A fixed to the right edge of the loop 40 and having a second strip 45B fixed to the back side 20 of the vest just to the right of the strip 45A. When the zipper 45 is completely open, the loop 40 may be folded rearwardly and to the left to permit the shoulder belt 13 to be placed along the back side 20 of the vest in the area of the loop. When the loop 40 is folded reversely and is secured by the zipper 45, it captivates the vest to the shoulder belt so that the belt may restrain forward movement of the upper end portion of the vest.

With the foregoing arrangement, the child may be placed in the vest 10 while all three zippers 25, 35 and 45 are open. After the zipper 25 has been closed and the flap 28 secured in its safety position by the button 29, the child may be placed in the car seat. The belts 11 and 13 then are placed in the loops 30 and 40, respectively, and upon zipping of the loops, the vest and the child are securely restrained by the belts.

Thus the present invention brings to the art a new and improved garment 10 which effectively restrains a child in a vehicle and eliminates the need for cumbersome and difficult-to-use child safety seats. Because both loops 30 and 40 may be opened completely, the belts 11 and 13 may be easily placed in the loops in spite of the junction 12 between the belts. Also, the location of the zipper 35 at the upper edge of the loop 30 and the location of the zipper 45 at the right side (i.e., the passenger side) of the loop 40 facilitate opening and closing of the loops.

While the preferred form of the garment 10 is a sleeveless vest, it should be appreciated that a sleeve-type garment such as a jacket could be provided with the loops 30 and 40. Also, the vest need not necessarily require the front zipper 25 but instead could be slipped over the neck and arms of the child in the manner of a sweater. In addition, it should be appreciated that the vest 10 with the zipper 25 could be strapped in place by the belts 11 and 13 before the child is placed in the vest.

I claim:

1. The combination of, a vehicle safety harness having a lap belt and a shoulder belt, and a torso garment adapted to coact with the lap belt and shoulder belt in order to restrain a human occupant in a vehicle, said garment being made of flexible material and having upper and lower end portions, having front and back sides, and having arm-receiving means and neck-receiving means between the front and back sides adjacent the upper end portion of the garment, said combination being characterized in that said garment comprises a first loop extending generally horizontally across the back side of the lower end portion of the garment and having upper and lower edges, one of said edges being secured to said back side, the other of said edges being free of said back side whereby said loop may be flexed rearwardly from said back side to enable said lap belt to be placed in said loop, first means for releasably securing said other edge to said back side thereby to captivate said lap belt in said loop, a second loop extending along the upper end portion of the back side of said garment above said first loop and having first and second edges located in non-parallel relation to the edges of said first loop, one of the edges of said second loop being secured to said back side, the other edge of said second loop being free of said back side whereby said second loop may be flexed rearwardly from said back side to enable said shoulder belt to be placed in said second loop, and second means for releasably securing said other edge of said second loop to said back side thereby to captivate said shoulder belt in said second loop.

2. The combination defined in claim 1 in which the garment is a sleeveless vest, said arm-receiving means being holes located between said front and rear sides.

3. The combination of, a vehicle safety harness having a lap belt and a shoulder belt, and a vest adapted to coact with the lap belt and shoulder belt in order to restrain a human occupant in a vehicle, said vest being made of flexible material and having upper and lower end portions, having front and back sides, and having arm holes and a neck hole between the front and back sides adjacent the upper end portion of the vest, said combination being characterized in that said vest comprises a first loop extending generally horizontally across the back side of the lower end portion of the vest and having upper and lower edges, one of said edges being secured to said back side, the other of said edges being free of said back side whereby said loop may be flexed rearwardly from said back side to enable said lap belt to be placed in said loop, first means for releasably securing said other edge to said back side thereby to captivate said lap belt in said loop, a second loop extending generally vertically along the upper end portion of the back side of said vest above said first loop and having left and right edges, one of the edges of said second loop being secured to said back side, the other edge of said second loop being free of said back side whereby said second loop may be flexed rearwardly from said back side to enable said shoulder belt to be placed in said second loop, and second means for releasably securing said other edge of said second loop to said back side thereby to captivate said shoulder belt in said second loop.

4. The combination defined in claim 3 in which said lower edge of said first loop is secured to said back side and in which said upper edge of said first loop is free of said back side.

5. The combination defined in claim 4 in which said first releasable means comprise a zipper having a first strip of zipper material secured to the upper edge of said first loop and having a second strip of zipper material secured to said back side above said first strip.

6. The combination defined in claim 3 in which said left edge of said second loop is secured to said back side and in which said right edge of said second loop is free of said back side.

7. The combination defined in claim 6 in which said second releasable means comprise a zipper having a first strip of zipper material secured to the right edge of said second loop and having a second strip of zipper material secured to said back side to the right of said first strip.

8. The combination defined in claim 6 in which said second loop includes an upper end located adjacent said neck hole, said second loop being inclined so as to progress to the left upon proceeding downwardly from said upper end.

9. The combination defined in claim 3 in which said front side of said vest is defined by two separate halves which may be flexed apart to enable the vest to be fitted onto the occupant, and third means for releasably securing said two halves of said front side together.

10. The combination defined in claim 9 in which said third means comprise a zipper having a first strip of zipper material secured to one of said halves and having a second strip of zipper material secured to the other of said halves, an actuating pull connected to one of said strips and located adjacent said neck hole when said zipper is fully closed, a flap secured to one of said halves and adapted to be flexed to a safety position covering said actuating pull when the latter is adjacent said neck hole, and means for releasably securing said flap to the other of said halves thereby to hold said flap in said safety position.

11. The combination of, a vehicle safety harness having a lap belt and a shoulder belt, and a sleeveless vest adapted to coact with the lap belt and shoulder belt in order to restrain a human occupant in a vehicle, said vest being made of flexible material and having upper and lower end portions, having front and back sides, and having arm holes and a neck hole between the front and back sides adjacent the upper end portion of the vest, the front side of said vest being defined by two separate halves which may be flexed apart to enable the vest to be fitted on the occupant, said combination being characterized in that said vest comprises first means for releasably securing said two halves of said front side together, a first loop extending generally horizontally across the back side of the lower end portion of the vest and having upper and lower edges, said lower edge being secured to said back side, said upper edge being free of said back side whereby said loop may be flexed downwardly and rearwardly from said back side to enable said lap belt to be placed in said loop, second means for releasably securing said upper edge to said back side thereby to captivate said lap belt in said loop, a second loop extending downwardly from right-to-left along the upper end portion of the back side of said vest above said first loop and having left and right edges, the left edge of said second loop being secured to said back side, the right edge of said second loop being free of said back side whereby said second loop may be flexed rearwardly and to the left from said back side to enable said shoulder belt to be placed in said second loop, and third means for releasably securing said right edge of said second loop to said back side thereby to captivate said shoulder belt in said second loop.

12. The combination defined in claim 11 in which said first, second and third means are zippers.

13. The combination defined in claim 12 in which the zipper which forms said first means comprises a first strip of zipper material secured to one of said halves and further comprises a second strip of zipper material secured to the other of said halves, an actuating pull connected to one of said strips and located adjacent said neck hole when said zipper is fully closed, a flap secured to one of said halves and adapted to be flexed to a safety position covering said actuating pull when the latter is adjacent said neck hole, and means for releasably securing said flap to the other of said halves thereby to hold said flap in said safety position.

* * * * *